UNITED STATES PATENT OFFICE.

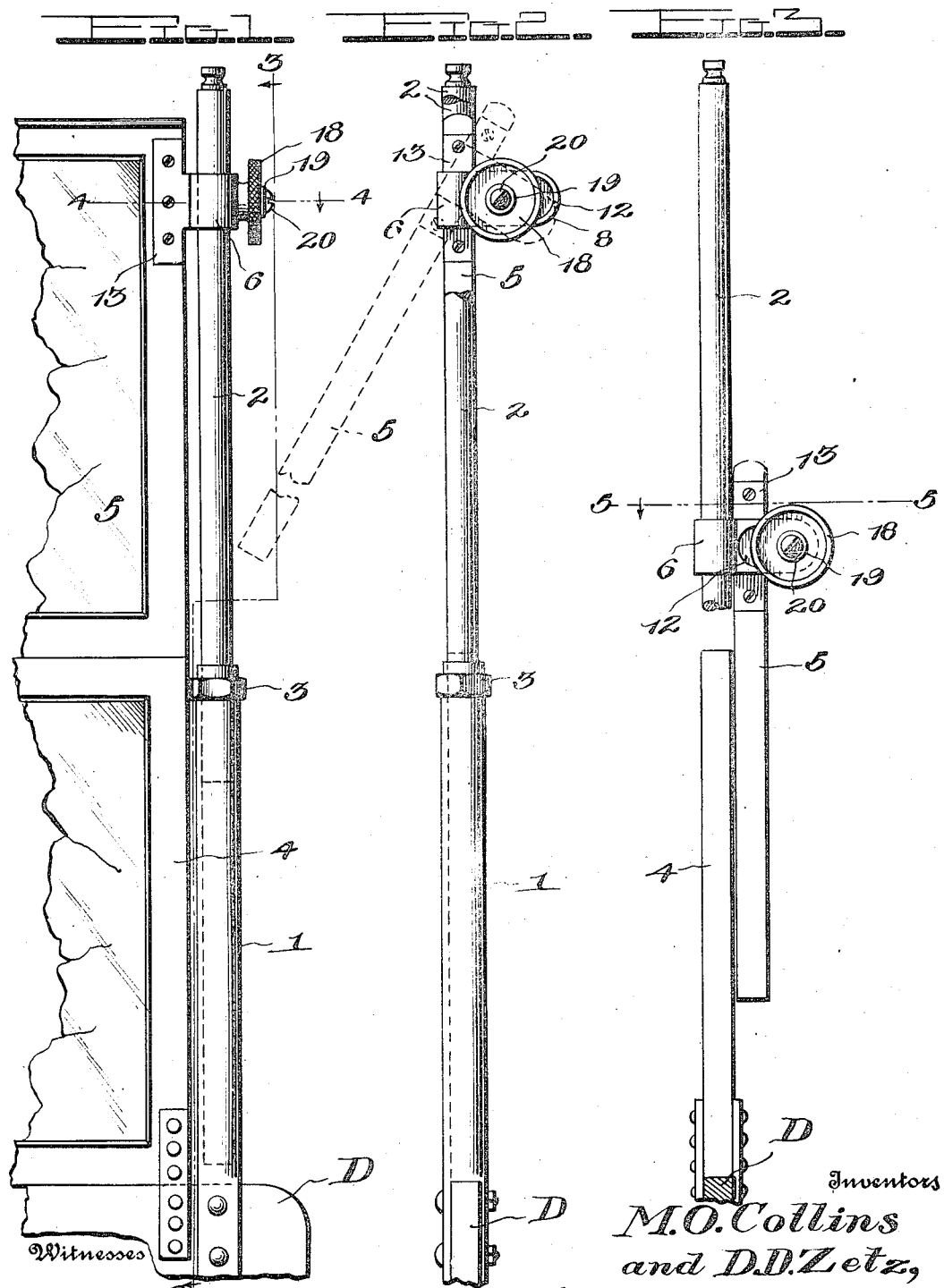

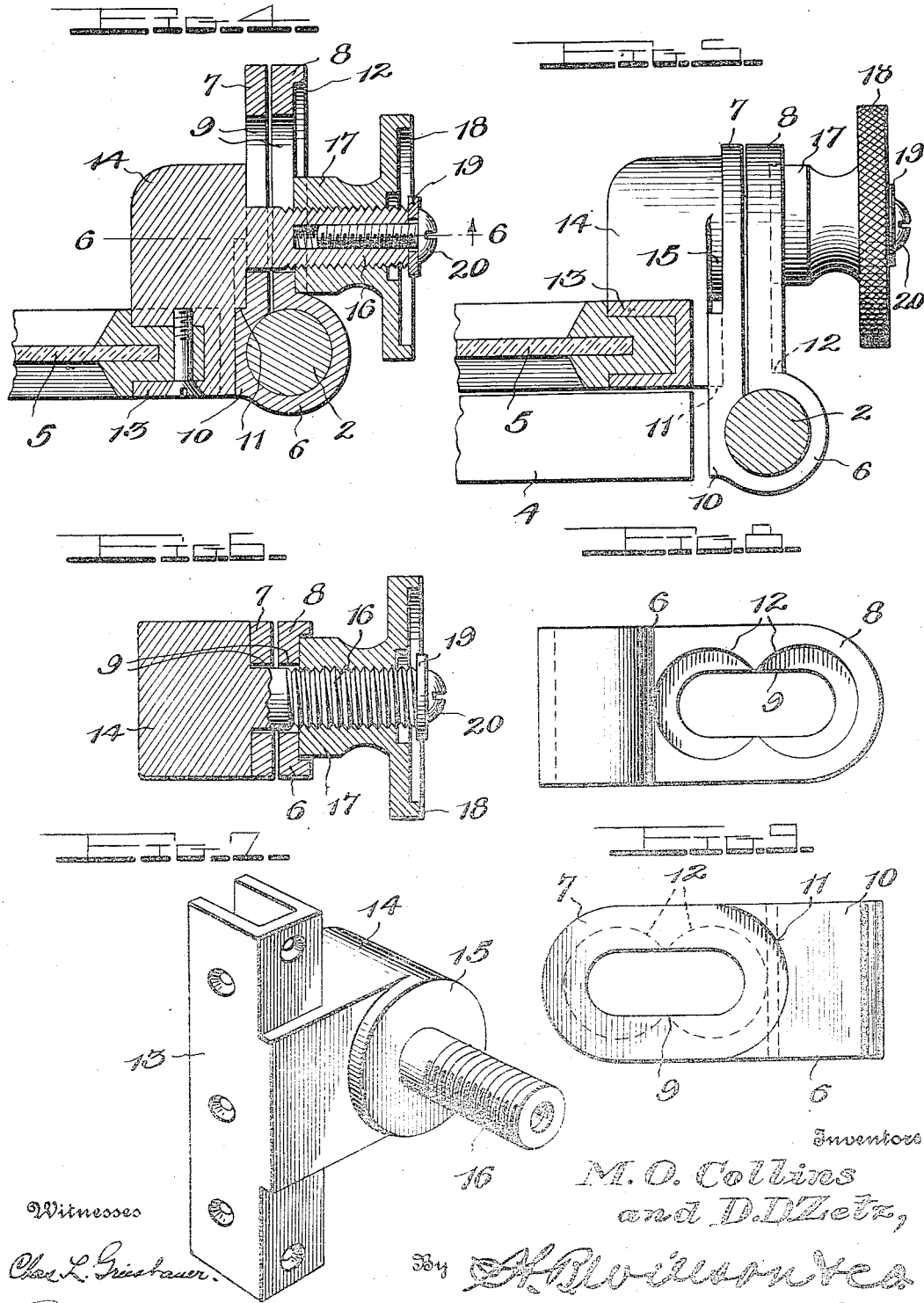

MERRITT O. COLLINS AND DANIEL D. ZETZ, OF PORTLAND, OREGON.

WIND-SHIELD.

1,176,131.  Specification of Letters Patent.  Patented Mar. 21, 1916.

Application filed December 10, 1914. Serial No. 876,553.

*To all whom it may concern:*

Be it known that we, MERRITT O. COLLINS and DANIEL D. ZETZ, citizens of the United States, residing at Portland, in the county of Multnomah and State of Oregon, have invented certain new and useful Improvements in Wind-Shields; and we do declare the following to be a full, clear, and exact description of the invention, such as will enable others skilled in the art to which it appertains to make and use the same.

Our invention relates to improvements in wind shields for automobiles and has for its object to provide such a device which may be used in connection with vehicles having "one man tops", these vehicles always having means for attaching the front of a top to the upper end of the wind shield. With the usual type of folding wind shield, however, this structure has proved inefficient, since when the shield is folded or lowered, no support is provided for the top.

It is therefore the object of this invention to provide structure which will effectively support the front of an automobile top at all times and to so mount the wind shield, or at least one section thereof, as to allow it to be swung forwardly and rearwardly and to be raised and lowered.

In reducing this idea to an operative device, we employ numerous novel features of construction and combination hereinafter described and claimed and shown in the accompanying drawings wherein:

Figure 1 is a rear elevation of a portion of a device constructed in accordance with our invention; Fig. 2 is an edge view thereof, parts being broken away and in section, and the upper section of the wind shield being in raised position; Fig. 3 is a view similar to Fig. 2 with said section of the wind shield lowered, this figure being taken substantially upon the line 3—3 of Fig. 1; Figs. 4 and 5 are horizontal sections as seen on the lines 4—4 of Fig. 1 and 5—5 of Fig. 3 respectively; Fig. 6 is a detail vertical section taken along the plane of the line 6—6 of Fig. 4. Fig. 7 is a perspective view showing the manner in which pivot studs to be described are mounted; Fig. 8 is an outer side view of one of the vertically adjustable slides; and Fig. 9 is an inner side view thereof.

In these drawings, constituting a part of this application, a portion of an automobile dashboard D is shown, from which a tubular section 1 of an upright standard rises, a second section 2 being telescoped with said section 1 and being held normally against movement in respect thereto by a nut 3. Likewise rising from the dashboard D and secured thereto in any appropriate manner, is the lower section 4 of the wind shield, the upper section 5 thereof normally resting upon the upper edge of said lower section as most clearly seen in Fig. 1.

Mounted for vertical adjustment upon the upper section 2 of the telescopic standard, is a slide 6 which is here shown in the form of a sleeve which is split on its forward side, a pair of horizontal ears 7 and 8 projecting forwardly from said sleeve on opposite sides of the slit therein. Both of these ears are slotted longitudinally as seen at 9, and the inner ear 7 is thickened at its inner end as seen at 10 whereby to form a curved shoulder 11 (see more particularly Figs. 4 and 9). The outer ear 8 is provided, in its outer side, with a pair of substantially circular recesses 12 which communicate with its slot 9, these formations being adapted for a purpose to be set forth.

Secured to the adjacent edge of the upper wind shield section 5, is a channel iron attaching plate 13 from which a block 14 projects forwardly, said block being provided with a lateral rounded extension 15 which normally abuts the curved shoulder 11 and which is provided with a hollow threaded stud 16, the latter projecting through the slots 9. With the parts in this position, a nut 17 which is here shown as formed integrally with a knurled hand wheel 18 is threaded on said stud 16 and is held against removal by a washer 19, the latter contacting with the outer end of the stud 16 and being held in this position by a left hand screw 20 which is threaded into the stud 16 as shown in Fig. 4.

The nut 17 is here shown of cylindrical formation and, when the parts stand as seen in Fig. 4 (in which position the lower edge of the section 5 contacts with the upper edge of the section 4), the inner end of this nut is seated within the innermost recess 12, thereby preventing the stud 16 and the parts connected therewith, from moving forwardly. When, however, the nut 17 is loosened to such an extent as to disengage it from the innermost recess 12, the entire section 5 may be forced forwardly, during which movement the stud will of course move forwardly in the slots 9, thus positioning the nut 17 opposite the outermost recess 12 and so locating the upper section 5 in respect to the lower section 4, as to allow the former to move downwardly as shown in Fig. 3, whereupon the nut 17 may be again tightened, thereby retaining said section 5 in its lowered position. It will be understood that tightening of the nut will also clamp the slide 6 in any one of its adjusted positions on the standard and that the section 5 of the wind shield may be swung forwardly and rearwardly, regardless of its positioning in respect to the lower section 4.

From the foregoing description, it will be seen that although the upper section of the wind shield may be adjusted vertically and arcuately to the desired amount, the telescopic standards, (or one piece standards if desired) remain in their upright positions to properly support the front of the vehicle top. When employing telescopic standards, however, the sections 2 may well be telescoped with the section 1 when no top is in use.

We have described the structure which is located at one side of the dashboard D but it is to be understood that this exact structure is duplicated at the other side thereof, it being thought necessary to illustrate only so much of the construction as to convey a clear understanding thereof.

From the foregoing, taken in connection with the accompanying drawings, it will be seen that comparatively simple structure has been provided for carrying out the objects of the invention, yet that the efficiency of the device will not be impaired by such simplicity.

We claim:

1. The combination with a vehicle and a pair of vertical rigid standards rising therefrom, of a pair of vertically adjustable slides on said standards, slotted horizontal ears projecting forwardly from said slides, a wind shield whose edges are located adjacent said slides, threaded studs projecting sidewise from said shield and through the slots in said ears, and nuts on said studs.

2. The combination with a vehicle and a pair of vertical rigid standards rising therefrom, of a pair of split sleeves mounted for vertical adjustment on said standards, a pair of horizontal ears projecting forwardly from each sleeve and located one on each half thereof, said ears having longitudinal slots, a wind shield between the two standards, threaded studs projecting sidewise from said shield through said slots, and nuts on said studs.

3. The combination with a vehicle and a pair of vertical rigid standards rising therefrom, of a pair of split sleeves mounted for vertical adjustment on said standards, a pair of horizontal ears projecting forwardly from each sleeve and located one on each half thereof, said ears having longitudinal slots, a wind shield whose edges are located adjacent the innermost of said ears, the outermost of the latter having spaced recesses communicating with their slots, studs projecting sidewise from the shield through the slots, and nuts on said studs, the inner ends of the latter being seated in certain of said recesses.

4. The combination with a vehicle, of an adjustable standard rising therefrom, an ear projecting forwardly from said standard and having a longitudinal slot, a wind shield adjacent said ear, a stud projecting sidewise from said shield through said slot, and a nut on said stud.

5. The combination with a vehicle and a pair of vertical rigid standards rising therefrom, of a pair of vertically adjustable slides in said standards, slotted horizontal ears projecting forwardly from said slides, a wind shield whose edges are located adjacent said slides, threaded studs projecting sidewise from said wind shield and through the slots in said ears, said studs being offset forwardly from the plane of the wind shield, whereby to provide the wind shield for forward and rearward adjustment, and nuts on said studs.

6. The combination with a vehicle and a pair of vertical rigid standards rising therefrom, of a pair of vertically adjustable slides on said standards, slotted horizontal ears projecting forwardly from said slides, a wind shield whose edges are located adjacent said slides, channeled attaching plates secured to the ends of said wind shield, blocks projecting forwardly from said attaching plates, threaded studs projecting outwardly from said blocks and through said slotted ears, whereby to provide the wind shield for forward and rearward adjustment, and nuts on said studs.

In testimony whereof we have hereunto set our hands in presence of two subscribing witnesses.

MERRITT O. COLLINS.
DANIEL D. ZETZ.

Witnesses:
F. H. DOWNES,
CHAS. L. HEWES.